United States Patent [19]

Sime

[11] Patent Number: 5,961,598
[45] Date of Patent: Oct. 5, 1999

[54] SYSTEM AND METHOD FOR INTERNET GATEWAY PERFORMANCE CHARTING

[75] Inventor: William Sime, Dallas, Tex.

[73] Assignee: Electronic Data Systems Corporation, Plano, Tex.

[21] Appl. No.: 08/871,157

[22] Filed: Jun. 6, 1997

[51] Int. Cl.⁶ .................................................. G06F 15/16
[52] U.S. Cl. .......................... 709/224; 709/223; 707/104
[58] Field of Search ......................... 395/200.53, 200.54; 707/10, 109, 514, 500, 3

[56] References Cited

U.S. PATENT DOCUMENTS

| | | | |
|---|---|---|---|
| 5,675,510 | 10/1997 | Coffey et al. | 395/200.54 |
| 5,703,940 | 12/1997 | Sattar et al. | 379/201 |
| 5,740,549 | 4/1998 | Reilly et al. | 705/14 |
| 5,787,253 | 7/1998 | McCreery et al. | 395/200.61 |
| 5,819,066 | 10/1998 | Bromberg et al. | 395/500 |
| 5,825,769 | 10/1998 | O'Reilly et al. | 370/360 |
| 5,870,559 | 2/1999 | Leshem et al. | 395/200.54 |

OTHER PUBLICATIONS

Hettihewa et al, "Designing and Implementing Microsoft Internet Information Server," Sams.net Publishing; 1996.
http–analyze man pages stefon@rent–a–guru.de, 1996.
sample.conf—configuration file for http–analyze, Jun. 27, 1996.
output of http–analyze http://www.geckil.com/harvest/statistics/index.html, Jan. 1998.
output of http–analyze http://www.ihlas.net/statistics/stats0297.html; Feb. 1997.

*Primary Examiner*—Mehmet B. Geckil
*Attorney, Agent, or Firm*—L. Joy Grienbenow; Baker & Botts L.L.P.

[57] ABSTRACT

A system for Internet gateway performance charting includes an internal network (10) having one or more servers interconnecting a plurality of computing devices (12). The system also includes an Internet gateway (16) coupled to the internal network (10) and to the public Internet (14). The Internet gateway (16) provides connectivity between the internal network (10) and the public Internet (14). The Internet gateway (16) also executes an application that gathers statistics on the performance of the Internet gateway (16) and prepares a file (19) storing statistics information. The system includes a designated server (18) of the internal network (10) that executes an application that periodically receives the file (19) from the Internet gateway (16), processes the file (19), recovers the statistics information, and populates a database (21) with statistics data. The system further includes a computing device (12) of the plurality of computing devices (12) that executes an application that obtains statistics data from the database (21) and displays selected performance charts (23) based upon that statistics data such that a user of the computing device (12)' can view performance charts of the Internet gateway (16).

16 Claims, 11 Drawing Sheets

SYSTEM AND METHOD FOR INTERNET GATEWAY PERFORMANCE CHARTING

TECHNICAL FIELD OF THE INVENTION

This invention relates in general to the field of electronic systems, and more particularly to a system and method for Internet gateway performance charting.

BACKGROUND OF THE INVENTION

Numerous organizations use private internal communication networks in day-to-day operations. Typically, these internal networks are secure and not open to general access by external third parties. With the increased usage of the public Internet for business and other purposes, it has become desirable for an organization to connect the users of the organization's internal network to the public Internet.

Many organizations use Internet gateways, implemented by computer workstations executing software, to provide a connection between the internal network and the Internet. These Internet gateways can include firewall protection for the internal network in addition to providing connectivity between the internal network and the Internet. Where an organization uses more than one Internet gateway, each user on the organization's internal network can, for example, be assigned to a designated Internet gateway. The users of the internal network are thereby provided access to the Internet through their designated Internet gateways.

Use of Internet gateways provides an effective means for connecting a private internal network to the Internet without compromising the security of the internal network. However, the usage habits of the various users can vary greatly. Consequently, distributing the users across multiple Internet gateways to ensure best usage of resources and efficient service to the users is a difficult task. In accomplishing this task, it can be important to the organization to have a means for monitoring the performance of the Internet gateways.

SUMMARY OF THE INVENTION

In accordance with the present invention, a system and method for Internet gateway performance charting are disclosed that provide advantages over conventional monitoring tools.

According to one aspect of the present invention, a system for Internet gateway performance charting includes an internal network having one or more servers interconnecting a plurality of computing devices. The system also includes an Internet gateway coupled to the internal network and to the public Internet. The Internet gateway provides connectivity between the internal network and the public Internet. The Internet gateway also executes an application that gathers statistics on the performance of the Internet gateway and prepares a file storing statistics information. The system includes a designated server of the internal network that executes an application that periodically receives the file from the Internet gateway, processes the file, recovers the statistics information, and populates a database with statistics data. The system further includes a computing device of the plurality of computing devices that executes an application that obtains statistics data from the database and displays selected performance charts based upon that statistics data such that a user of the computing device can view performance charts of the Internet gateway.

A technical advantage of the present invention is the provision of a system that allows an organization to monitor and chart Internet gateway user activity and resource usage to allow proactive planning for expansion and reassignment before facilities become congested and users are adversely impacted.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Figure 1:
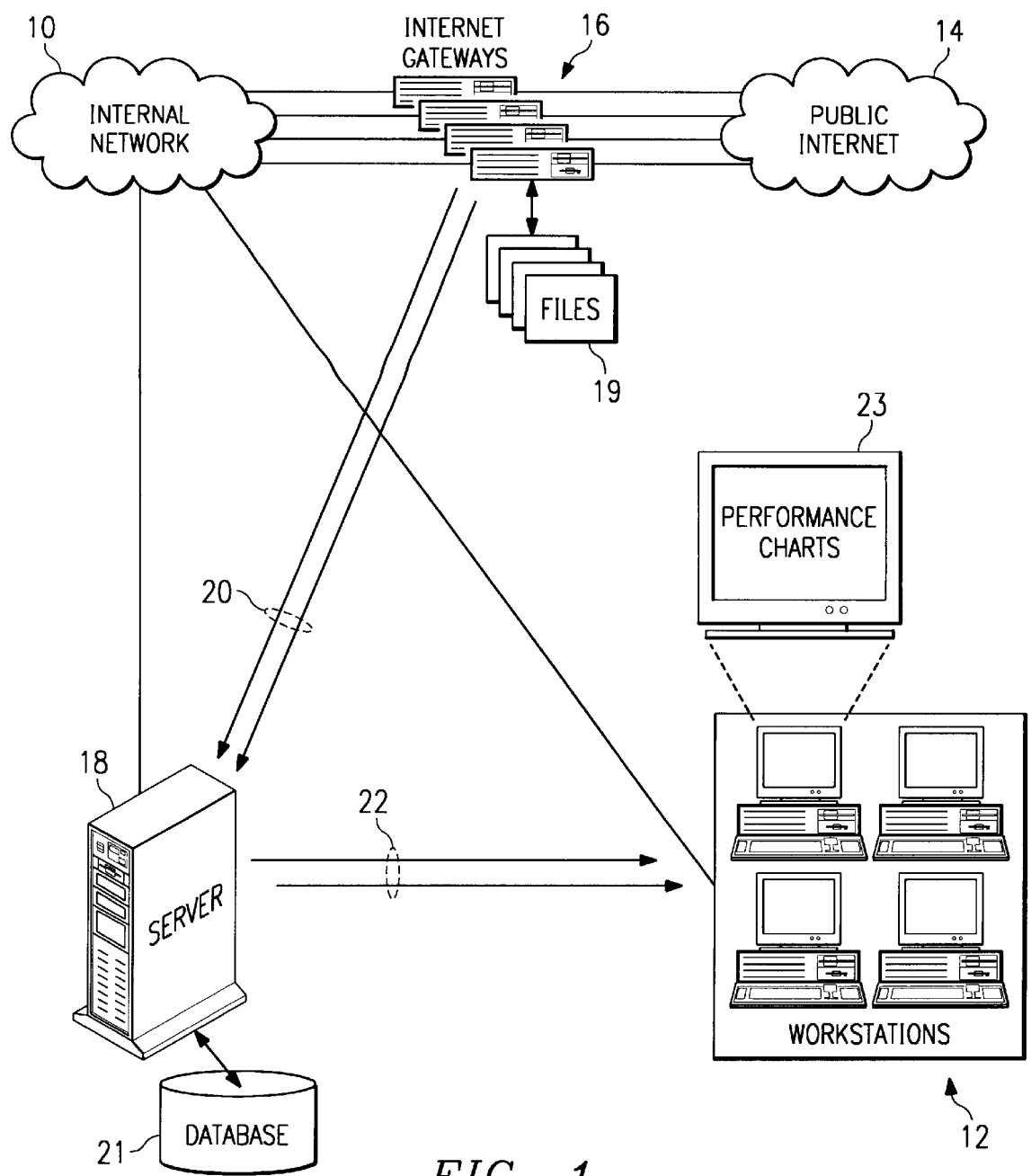
FIG. 1 is a block diagram of one embodiment of a system for Internet gateway performance charting according to the teachings of the present invention.

FIG. 1 is a block diagram of one embodiment of a system for Internet gateway performance charting according to the teachings of the present invention. As shown, an internal network 10 of an organization is connected to the public Internet 14 by a plurality of Internet gateways 16. Each Internet gateway 16 operates to receive requests from internal network 10 for communication on public Internet 14. Internet gateway 16 then services these requests by interfacing with public Internet 14 and providing information back to internal network 10. Internet gateways 16 can perform additional functions such as firewall protection for internal network 10.

Internal network 10 interconnects a number of users within the organization who use computing devices 12 for access to internal network 10. Computing devices 12 can include computer workstations, personal computers and other such devices connected to internal network 10. Each computing device 12 can include memory, fixed data storage, a processor, a display, a keyboard, a network interface, and other conventional computer components. Internal network 10 can, for example, comprise a TCP/IP based network supported by a token ring, Ethernet or other network connection. Internal network 10 can include one or more server systems operating to maintain the network environment. A designated server 18 is used according to the present invention, to accomplish performance charting for Internet gateways 16.

According to the present invention, each Internet gateway 16 executes an application that gathers statistics information for the associated Internet gateway 16. This application also formats the gathered statistics information, for example, into a single file 19 which is stored on the associated Internet gateway 16. These statistics files 19 can be transferred using FTP (file transfer protocol) to designated server 18 or otherwise transferred to designated server 18. The transfer of statistics files 19 to server 18 is represented by the arrows 20 in FIG. 1.

A server application executes on server 18 and reads files 19 received from Internet gateways 16, processes those files 19, and populates a database 21 with statistics data based upon the information obtained from files 19. This server application component executing on server 18 can, for example, comprise a VISUAL BASIC program, running under WINDOWS 95 or WINDOWS NT, that reads files 19 and populates database 21. The transfer of files 19 from Internet gateways 16 to server 18 can be implemented as a manual process initiated from server 18 and as an automatic process periodically executed from either Internet gateway 16 or server 18. Database 21 on server 18 can be maintained in as small a physical size as possible by automatically cleaning and reorganizing database 21 using conventional database utilities. Database 21 contains current statistics information about the performance of each Internet gateway 16 based upon information obtained from files 19.

According to the present invention, a user of a computing device 12 can execute a client application that obtains statistics data from database 21. The transfer of statistics data from server 18 to computing device 12 is represented by arrows 22 in FIG. 1. This client application can also provide the user with a selection list of chart types for charting the performance of Internet gateway 16 based upon the statistics data. The user can thereby use the statistics data and chart types to generate performance charts 23 for selected Internet gateways 16. In one embodiment of the present invention, the client application executed on computing device 12 to perform the charting function can comprise a VISUAL BASIC application running under WINDOWS 3.1 or WINDOWS 95.

The statistics data obtained from server 18 by the client application executing on computing devices 12 can be obtained by downloading database 21 to obtain information as needed. In this manner, statistics information is gathered by each Internet gateway 16 and stored in files 19, transferred to server 18, stored as data in database 21 and accessed by computing devices 12 for generating Internet gateway performance charts 23. The types of performance charts 23 can include both user activity-related charts and resource usage-related charts that enable an organization to better allocate Internet gateway 16 resources and to better service users.

Database 21 can be structured, for example, as a relational database. In one example, database 21 comprises seven tables that are populated by data gathered from gateways 16 and are independent and have no relationship with one another. For this example, the primary key in each table is the ID column, and the tables have indices by system name and date/time (as applicable). The following tables describe the layout of these tables.

TABLE I

CPU Activity

| Column Name | Data Type | Description |
| --- | --- | --- |
| ID | Counter | Unique Row Idenfier |
| System Name | Text | Name of System from which data was collected |
| Date | Text | Date on which data was collected |
| Time | Date/Time | Time at which data was collected |
| System Percent | Number | Percent of time CPU was busy for System function |
| User Percent | Number | Percent of time CPU was busy for User function |

TABLE I-continued

CPU Activity

| Column Name | Data Type | Description |
| --- | --- | --- |
| I/O Percent | Number | Percent of time CPU was busy for I/O function |
| Idle Percent | Number | Percent of time CPU was idle |

TABLE II ftp Summary

| Column Name | Data Type | Description |
| --- | --- | --- |
| ID | Counter | Unique Row Idenfier |
| System Name | Text | Name of System from which data was collected |
| Date | Text | Date on which data was collected |
| Total Transfers | Number | Total Number of Gets/Puts for day |
| Total Gets | Number | Total Number of Gets (downloads) for day |
| Total Puts | Number | Total Number of Puts (uploads) for day |
| Total Get Bytes | Number | Total Number of bytes downloaded for day |
| Total Put Bytes | Number | Total Number of bytes uploaded for day |
| Average Get Bytes | Number | Average Number of bytes downloaded for day |
| Average Put Bytes | Number | Average Number of bytes uploaded for day |

TABLE III

HTTP Transactions per Hour

| Column Name | Data Type | Description |
| --- | --- | --- |
| ID | Counter | Unique Row Identifier |
| System Name | Text | Name of System from which date was collected |
| Date | Text | Date on which data was collected |
| Hour | Number | Hour of day |
| Transactions | Number | Total Number of http transactions for period |
| Average Bytes Transfer | Number | Average Number of bytes transferred by http transaction |

TABLE IV

Run Queue

| Column Name | Data Type | Description |
| --- | --- | --- |
| ID | Counter | Unique Row Identifier |
| System Name | Text | Name of System from which data was collected |
| Date | Text | Date on which data was collected |
| Time | Date/Time | Time for which data was collected |

TABLE IV-continued

Run Queue

| Column Name | Data Type | Description |
| --- | --- | --- |
| Run Queue Depth | Number | Average Run Queue Depth for period |
| Run Queue Percent | Number | Average Run Queue Percent for period |

TABLE V

Top Site Information

| Column Name | Data Type | Description |
| --- | --- | --- |
| ID | Counter | Unique Row Identifier |
| System Name | Text | Name of System from which data was collected |
| Date | Text | Date on which data was collected |
| Site Name | Text | Name of http site |
| Number of Accesses | Number | Number of accesses for this site |

TABLE VI

Top url Information

| Column Name | Data Type | Description |
| --- | --- | --- |
| ID | Counter | Unique Row Identifier |
| System Name | Text | Name of System from which data was collected |
| Date | Text | Date on which data was collected |
| url Name | Text | Name of url |
| Number of Accesses | Number | Number of accesses for this url |

TABLE VII

User Count

| Column Name | Data Type | Description |
| --- | --- | --- |
| ID | Counter | Unique Row Identifier |
| System Name | Text | Name of System from which data was collected |
| Date | Text | Date on which data was collected |
| Number of Users | Number | Number of user accounts defined on system |

Figure 2A:
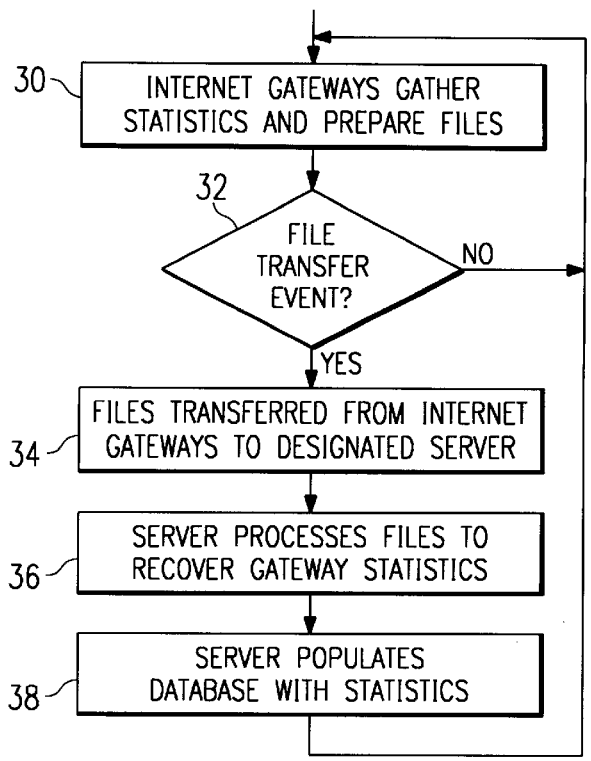
FIGS. 2A and 2B are flow charts of one embodiment of a method for Internet gateway performance charting according to the teachings of the present invention.
Figure 2B:
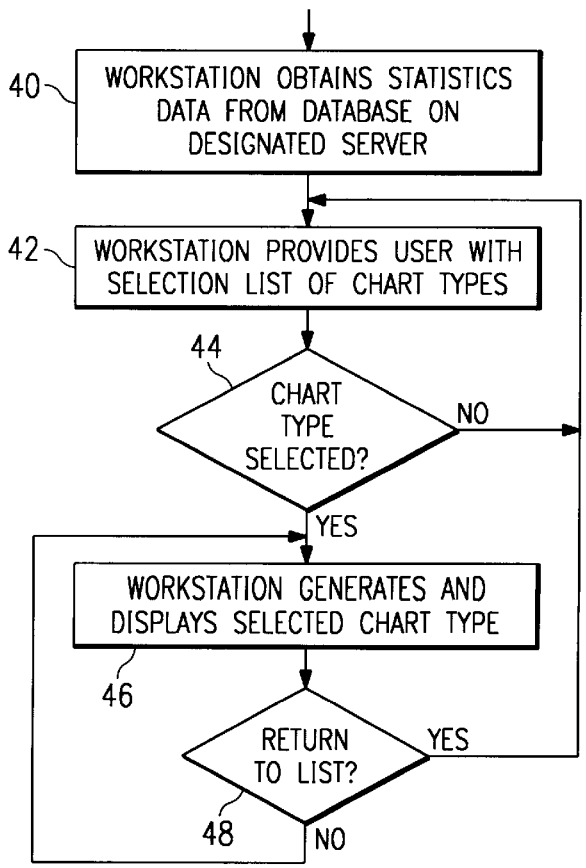

FIGS. 2A and 2B are flow charts of one embodiment of a method for Internet gateway performance charting according to the teachings of the present invention. FIG. 2A shows one embodiment of a method for gathering statistics information from the Internet gateways and maintaining a database on a server in the internal network. In step 30 of FIG. 2A, the Internet gateways gather statistics information and prepare files storing that information. These statistics can be gathered and files prepared, for example, by a UNIX-based application executed by each Internet gateway. The statistics information can include both user Internet activity and resource usage information. The files prepared by each Internet gateway can be text files, flat files, or other file formats appropriate for storing the statistics information.

In step 32, the Internet gateways determine whether or not a file transfer event should occur. If not, each Internet gateway continues to gather statistics and prepare files. If a file transfer event should occur, the statistics files are transferred, in step 34, from each Internet gateway to a designated server in an organization's internal network. This file transfer can be initiated manually or by an automatic process executing on each Internet gateway and can be triggered at predetermined time periods. Alternatively, this file transfer can be initiated automatically or manually from the designated server at predetermined time periods.

In step 36, the designated server processes the files transferred from the Internet gateways to recover the gateway statistics. Then, in step 38, the server populates a database with data based upon the statistics information. After step 38, the method continues, in step 30, with the Internet gateways gathering statistics and preparing files. The method of FIG. 2A maintains the database on the designated server with statistics data based upon the most recent files transferred from the Internet gateways. The method of FIG. 2A can be implemented, for example, by a UNIX-based application executing on each Internet gateway, and a VISUAL BASIC application executing on the server.

Figure 3:
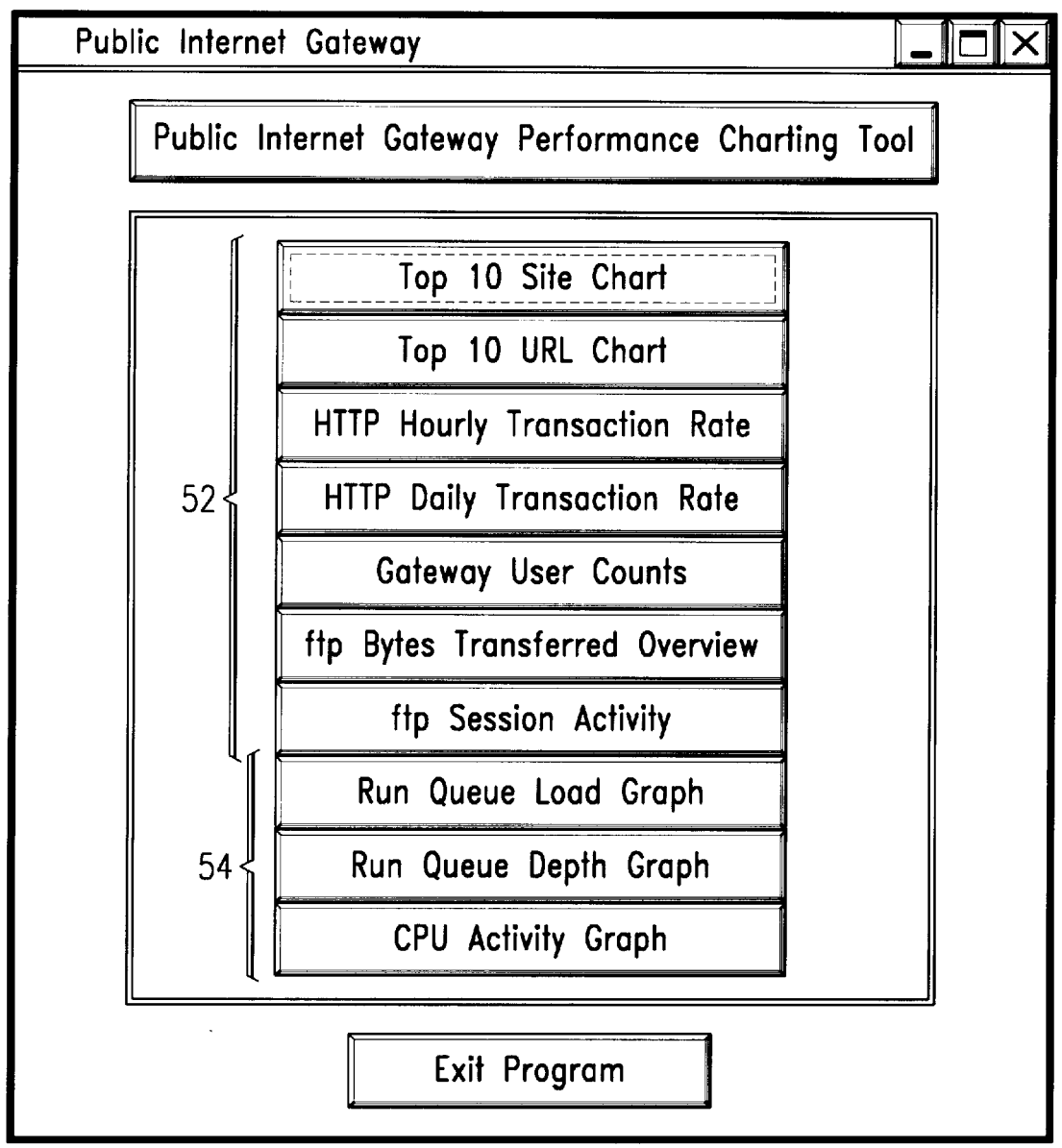
FIG. 3 is a diagram of one embodiment of a selection list of chart types provided to a user according to the teachings of the present invention.

FIG. 2B shows an embodiment of a method for providing performance charting to a user using the data in the database maintained on the designated server according to the teachings of the present invention. The method of FIG. 2B can be implemented, for example, by a VISUAL BASIC client application executing on a computing device in the internal network. In step 40, the computing device obtains statistics data from the database on the designated server. The computing device can obtain the statistics data by downloading the entire database from the server or portions of the database as needed. In step 42, the computing device provides a user with a selection list of chart types. One embodiment of a list of chart types is shown in FIG. 3. In step 44, the computing device determines whether a chart type has been selected by the user. If not, the computing device continues to provide the user with a selection list of chart types in step 42.

If a chart type is selected, the computing device generates and displays the selected chart type in step 46. The user is then allowed to perform functions appropriate to that chart type including modifying parameters and printing or storing performance chart images. Some embodiments of performance charts are provided by FIGS. 4A through 4H. In step 48, the computing device determines whether the user desires to return to the chart type list. If so, the method continues at step 42 to wait for a new selection. If not, the method continues at step 46 by allowing the user to continue to use the selected chart type. However, it should be understood that, at any point, the user can exit the application executing on the computing device.

The step of obtaining statistics data from the database, shown as step 40 in FIG. 2B, can be executed after selecting a chart type in step 44. In this case, the information needed to generate a performance chart of the selected chart type is obtained from the database on the server only after that chart type is selected. This may better be suited to an environment in which, due to network speed and resources, it is more efficient for the computing device to access the database and only obtain needed portions of the statistics data rather than downloading the entire database.

FIG. 3 is a diagram of one embodiment of a selection list of chart types, indicated generally at 50, for public Internet gateway performance charting. As shown, selection list 50 includes a plurality of user activity-related chart types, indicated generally at 52, and a plurality of resource usage-related chart types, indicated generally at 54. Selection list 50 also includes an "exit" button for allowing the user to exit the application. The selection list 50 is provided to a user of a computing device 12 who desires to view performance charts concerning the Internet gateways. Selection list 50 allows the user to select one of the listed chart types. After a chart type is selected, a window providing functionality related to that chart type is displayed to the user. It should be understood that other types of performance charts can be provided, in addition to those listed in selection list 50, that reflect the user activity or resource usage of the Internet gateways.

Figure 4A:
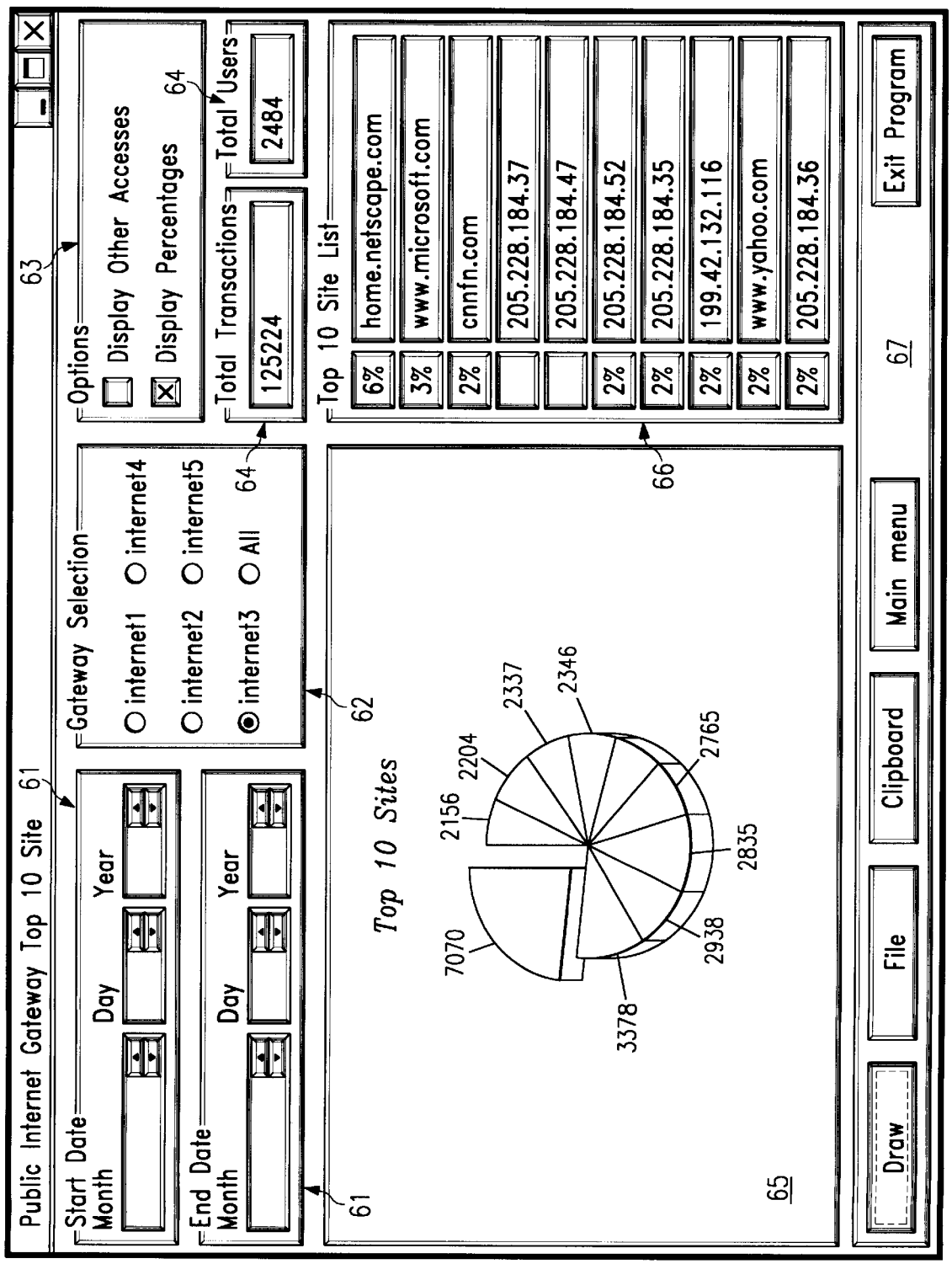
FIGS. 4A through 4H are diagrams of examples of performance charts provided to a user according to the teachings of the present invention.

FIGS. 4A through 4H are diagrams of examples of performance charts provided to the user according to the teachings of the present invention. FIG. 4A is a diagram of one embodiment of a window, indicated generally at 60, for a top ten site performance chart. Window 60 includes a time period selection area 61 that allows the user to set a start date and end date for the performance chart. A gateway selection area 62 allows the user to select a specific one or all of the Internet gateways for charting. An options area 63 allows the user to select particular options. The options displayed in FIG. 4A are to "display other accesses" and to "display percentages." A total numbers area 64 provides the user with total transactions and users for the selected gateways. As should be understood, alternate or additional user interface features could also be provided.

A chart area 65 provides the user with a performance chart graphically displaying the top ten sites. Further, a list area 66 provides the user with a uniform resource locator (URL) or internet protocol (IP) address for the top ten sites along with a percentage associated with each site. The top ten sites and top ten site list represent the most accessed Internet web sites through the selected Internet gateways. This allows the user to assess user activity based upon the top ten sites using the performance chart shown in FIG. 4A. Window 60 further includes a plurality of buttons 67 that allow the user to perform functions such as drawing, filing, pasting to the clipboard, returning to the main menu, and exiting the program. After the user has selected a start and end date range and selected the Internet gateways, the user can select the "draw" button to draw the performance chart, the "file" button to save the chart to a file, and the "clipboard" button to paste the chart to the computer clipboard. By selecting the "main menu" button, the user returns to the selection list shown in FIG. 3. Further, by selecting the "exit program" button, the user exits the performance charting application.

Figure 4B:
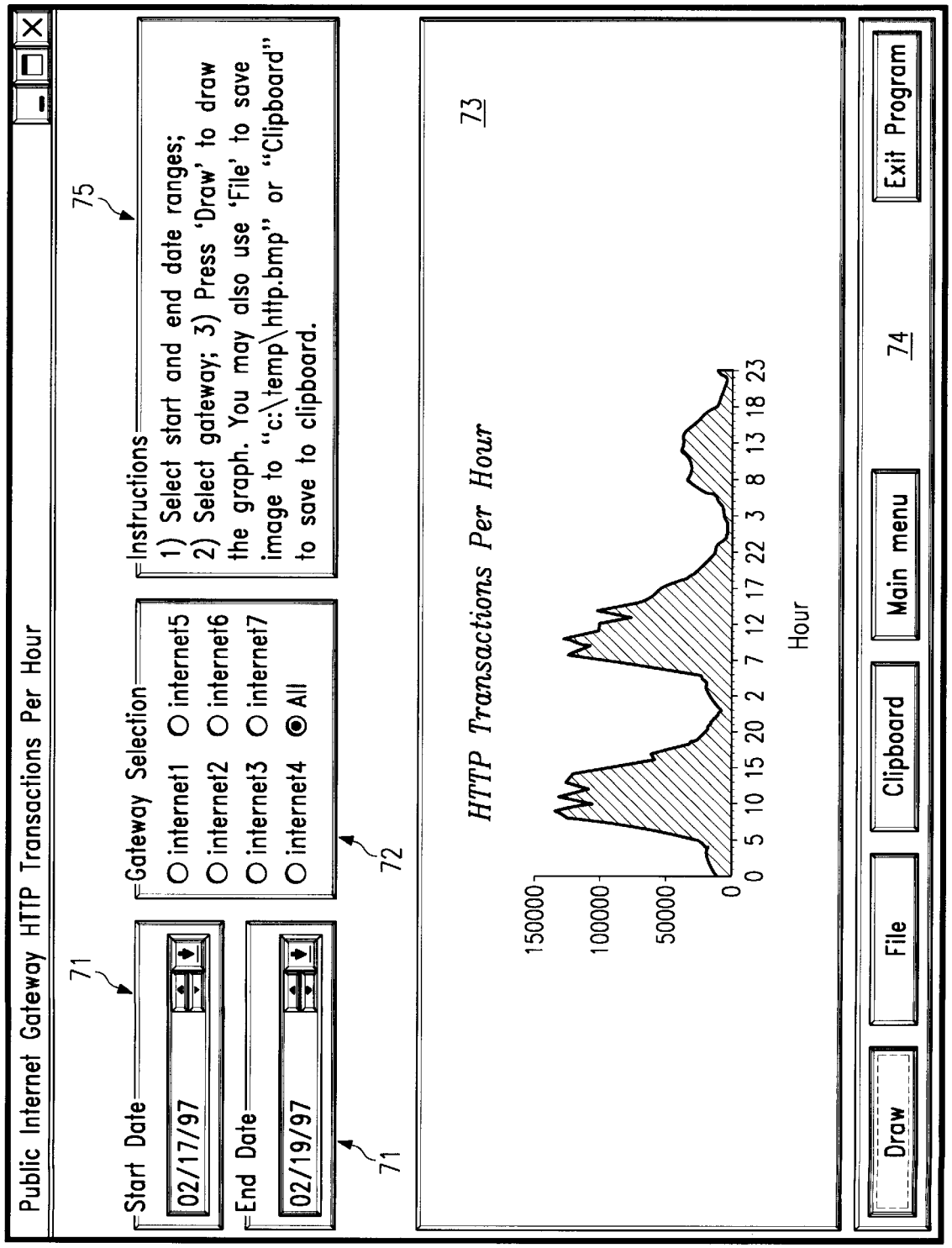

FIG. 4B is a diagram of one embodiment of a window, indicated generally at 70, for a hypertext transfer protocol (HTTP) hourly transaction rate performance chart. Window 70 includes a time period area 71 and a gateway selection area 72 similar to that discussed above with respect to FIG. 4A. Window 70 also includes a chart area 73 providing a graphical display of a performance chart showing the HTTP transactions per hour for the selected gateways. Further, similar to that shown in FIG. 4A, window 70 includes a plurality of buttons 74 providing certain functions to the user. In addition, window 70 includes an instruction area 75 that provides the user with instructions on how to use the HTTP transactions per hour performance chart. As shown, chart area 73 provides the user with a performance chart of the HTTP transactions per hour for the selected Internet gateways based upon the time period set in area 71.

Figure 4C:
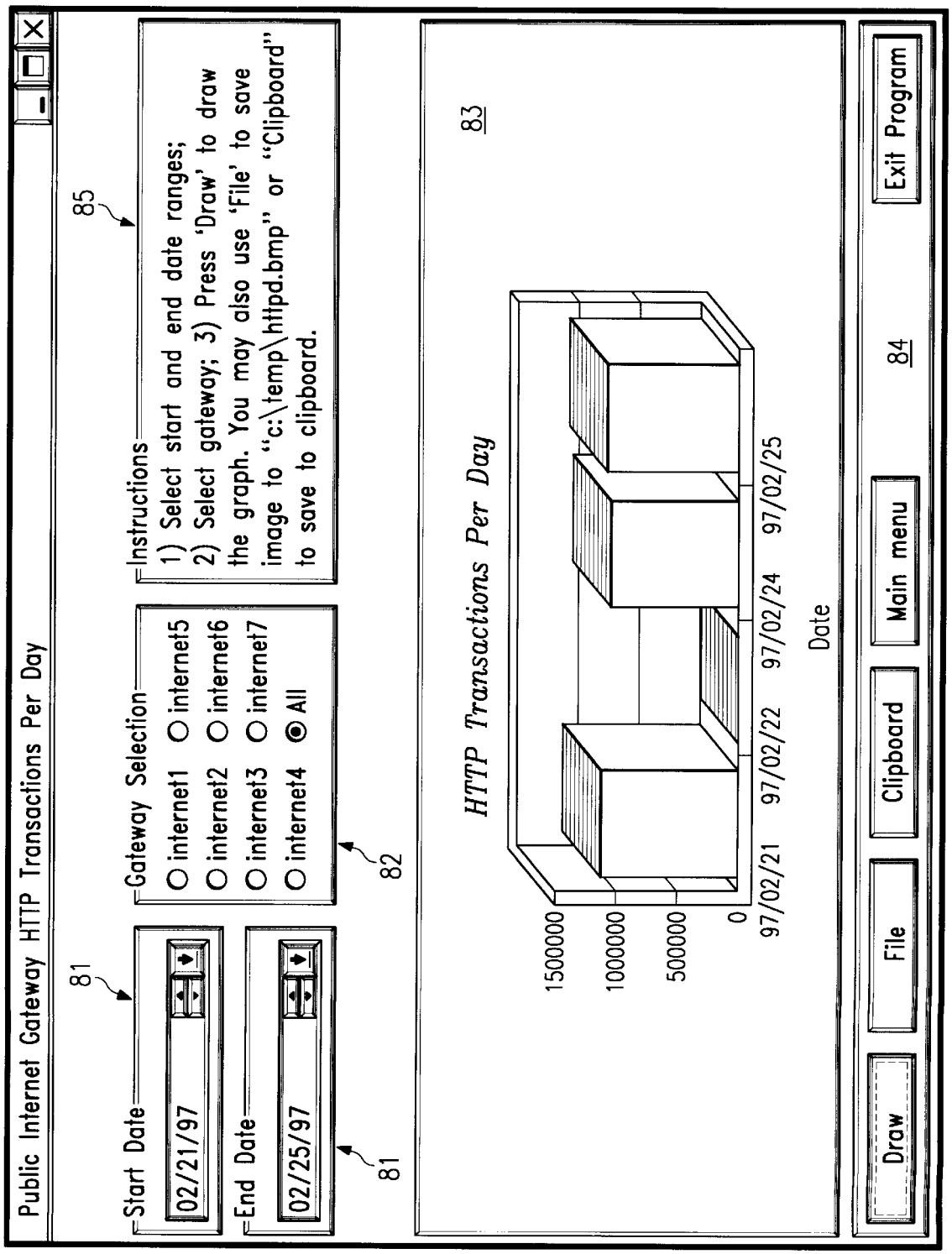

FIG. 4C is a diagram of one embodiment of a window, indicated generally at 80, for an HTTP transactions per day performance chart. As shown, window 80 includes a time period area 81 and a gateway selection area 82 as discussed above. Window 80 also includes a chart area 83 for providing a graphical display of a performance chart of the HTTP transactions per day. Further, window 80 includes a plurality of buttons 84 and an instruction area 85 similar to those discussed above. The chart area 83 provides a bar graph of the HTTP transactions per day based upon the time period and gateway selections made in areas 81 and 82.

Figure 4D:
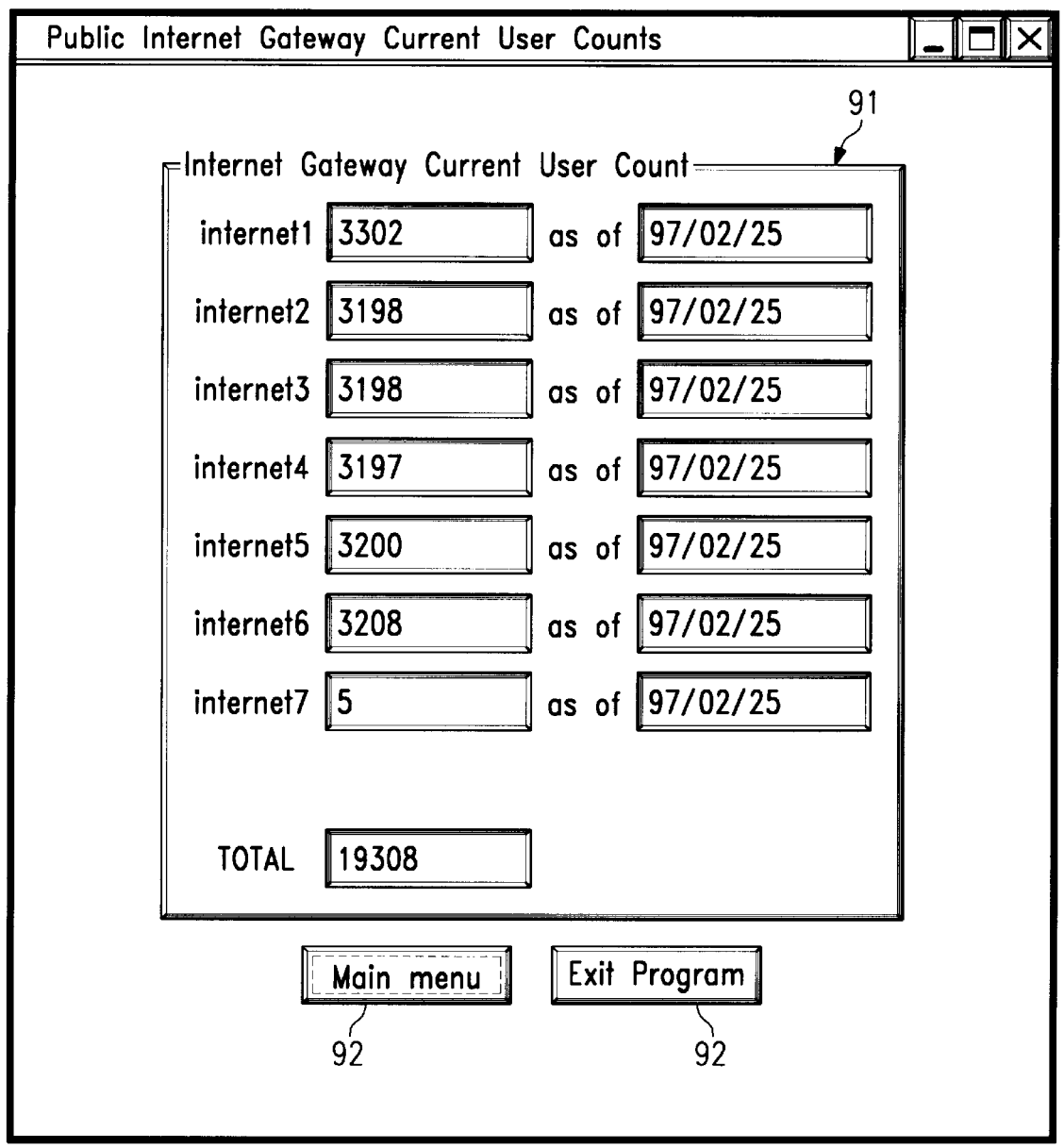

FIG. 4D is a diagram of one embodiment of a window, indicated generally at 90, for a gateway user count performance chart. As shown, window 90 includes a user count area 91 and a plurality of buttons 92. User count area 91 shows the current users for each Internet gateway as of the particular date shown. This provides the total count of users that have access to each Internet gateway along with the date on which that count is current.

Figure 4E:
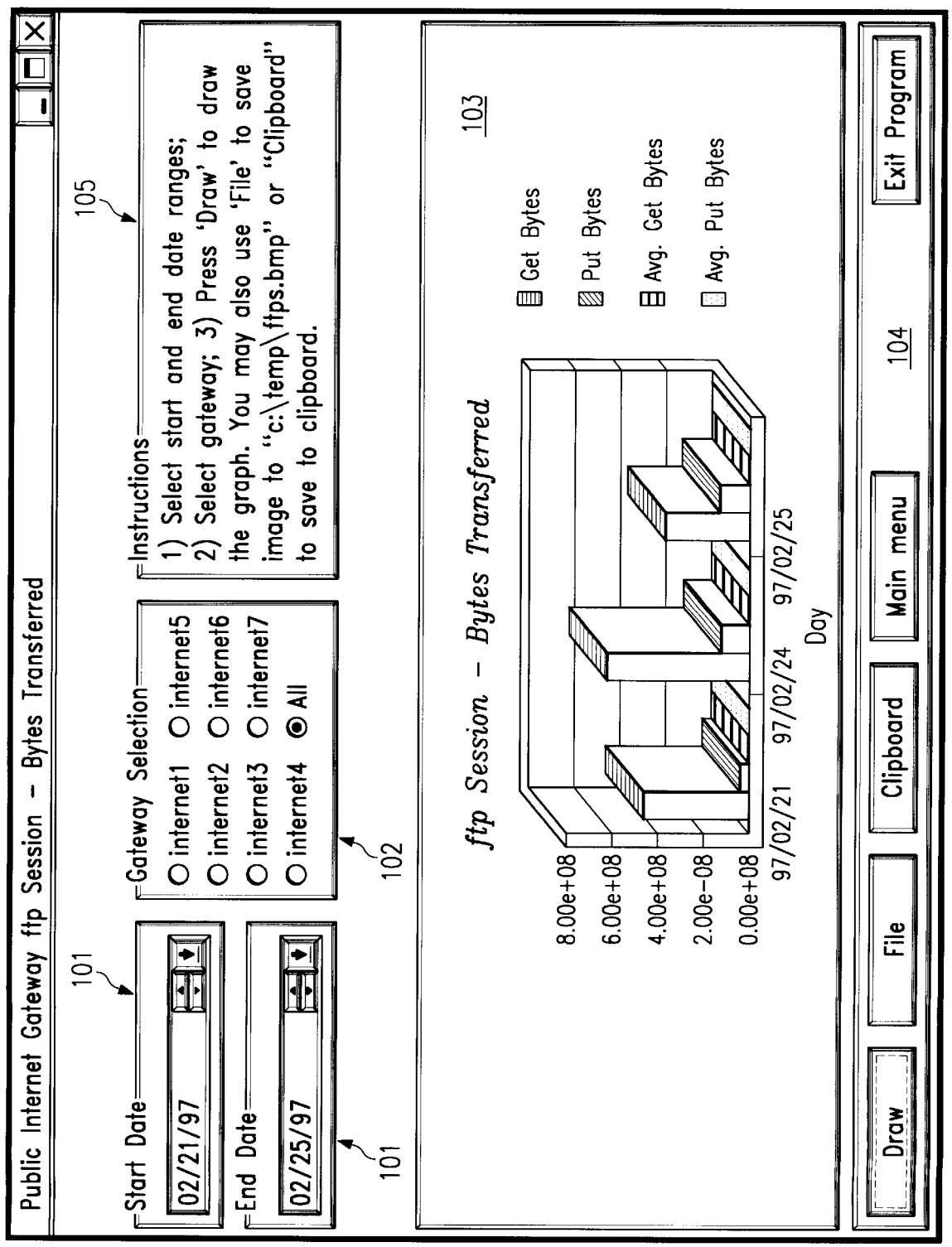

FIG. 4E is a diagram of one embodiment of a window, indicated generally at 100, for an FTP session-bytes transferred performance chart. As shown, window 100 includes a time period area 101 and a gateway selection area 102 similar to those discussed above. A chart area 103 provides the user with a graphical display of a performance chart of the bytes transferred during FTP sessions per day for the selected gateways. Window 100 further includes a plurality of buttons 104 and an instruction area 105 similar to those discussed above. As shown, the performance chart provided in chart area 103 can include "GET bytes", "PUT bytes", "average GET bytes", and "average PUT bytes" for each day. The "GET bytes" represent the quantity of data downloaded using an FTP session, and the "PUT bytes" represents the quantity of data uploaded using an FTP session. The average byte counts are based upon the number of bytes averaged per session while the other numbers are the totals for the selected Internet gateways during the selected time period.

Figure 4F:
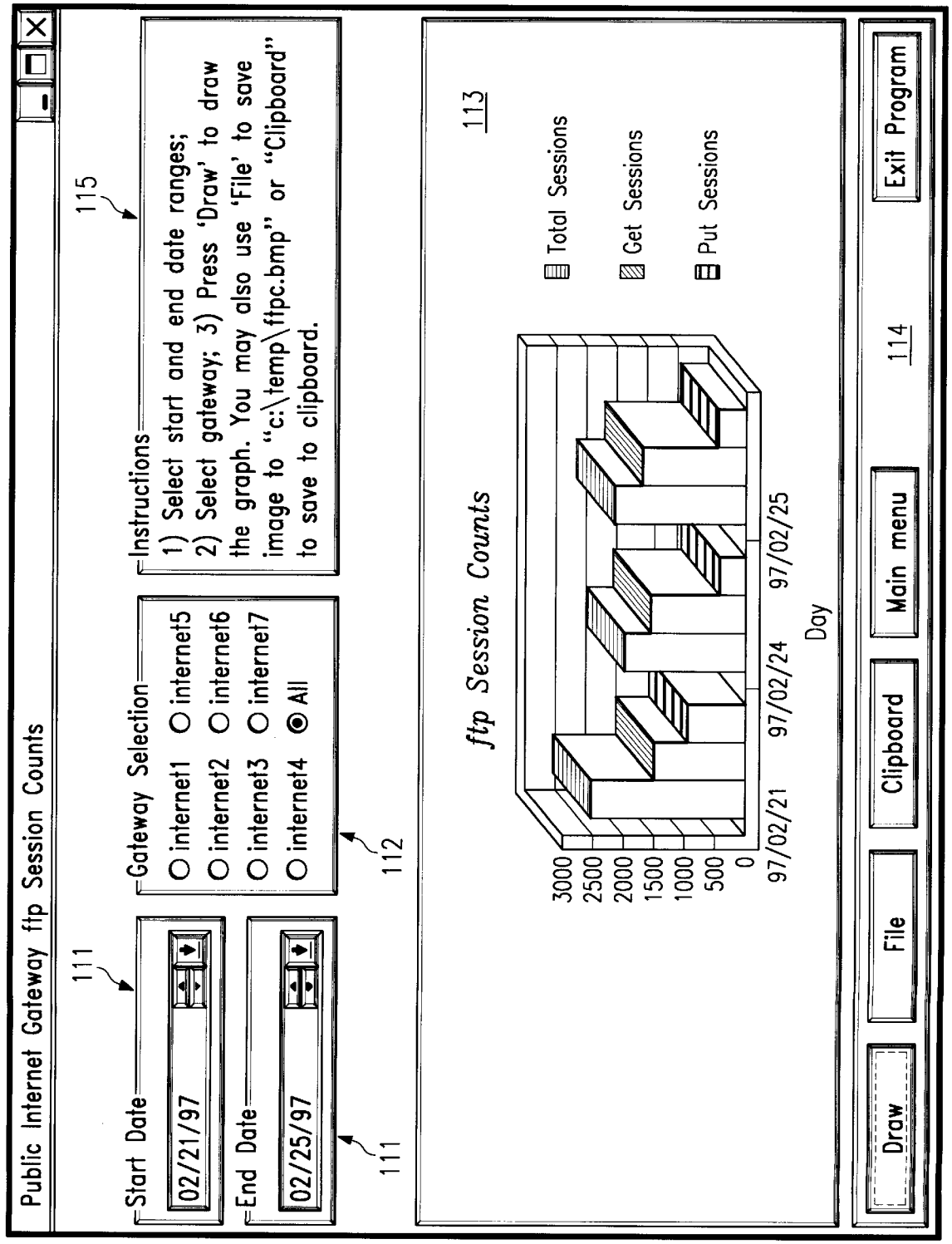

FIG. 4F is a diagram of one embodiment of a window, indicated generally at 110, for an FTP session count performance chart. As shown in FIG. 4F, window 110 includes a time period area 111 and a gateway selection area 112. Window 110 further includes a chart area 113, a plurality of buttons 114 and an instruction area 115. Chart area 113 provides the user with a graphical display of a performance chart of the FTP session counts during the designated time period for the selected gateways. This performance chart includes the total sessions, the "GET" sessions, and the "PUT" sessions. This performance chart provides information about the selected Internet gateways with respect to the number of FTP sessions flowing through that gateway and the breakdown of those sessions between files being downloaded and files being uploaded.

Figure 4G:
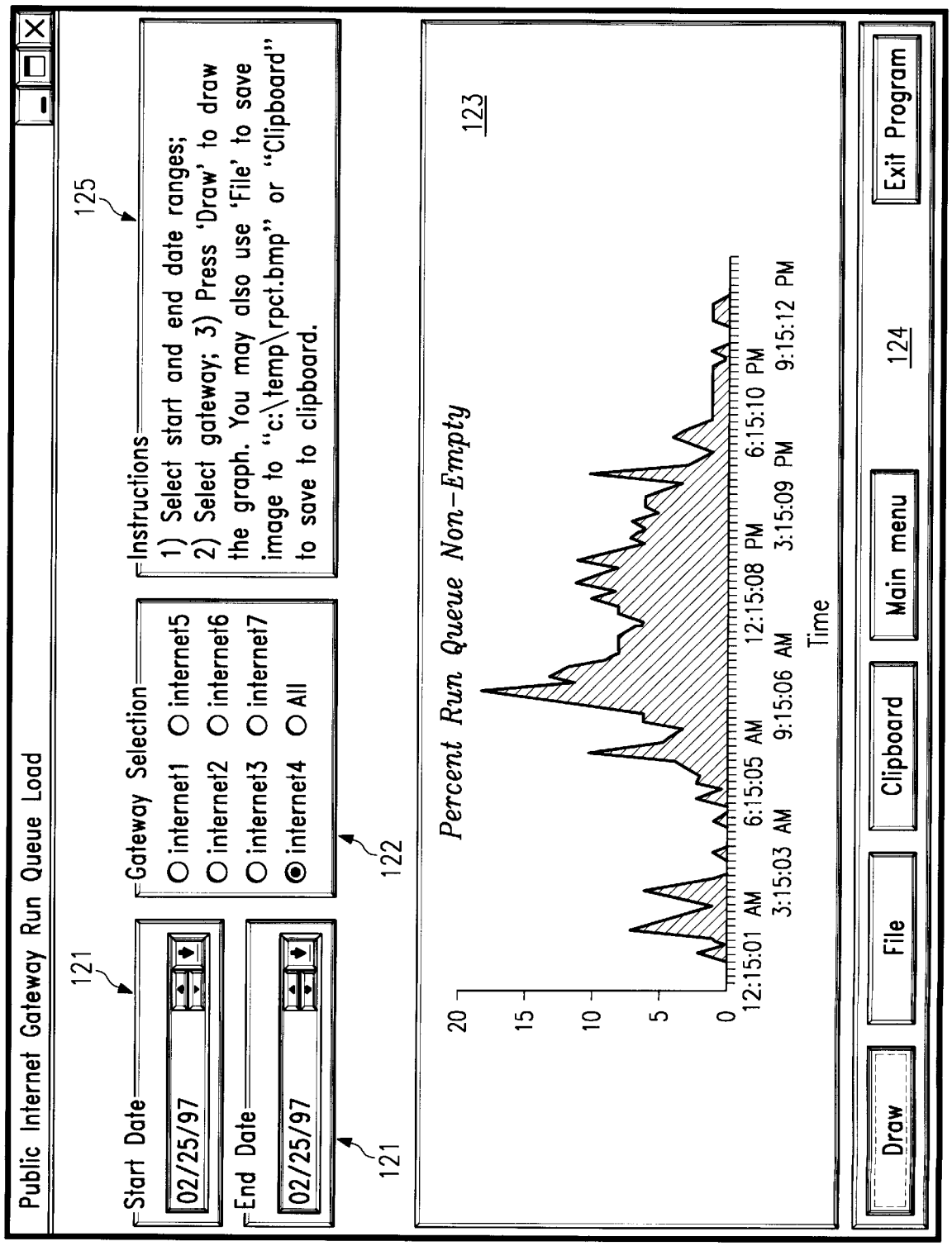

FIG. 4G is a diagram of one embodiment of a window, indicated generally at 120, for a run queue load performance chart. As shown in FIG. 4G, window 120 includes a time period area 121 and a gateway selection area 122. Window 120 also includes a chart area 123, a plurality of buttons 124 and an instruction area 125. Chart area 123 provides the user with a graphical display of a performance chart of the percent of time that the run queue was non-empty during the designated time period and the selected gateways. The run queue contains processes that are waiting on CPU resources in the Internet gateway. Thus, the displayed performance chart shows those time periods during which users are waiting for requests to be processed by the Internet gateway. Unlike the chart types of FIGS. 4A through 4F, which can be considered user activity-related chart types, the chart type of FIG. 4G is a resource-related chart type that reflects resource usage of the Internet gateways.

Figure 4H:
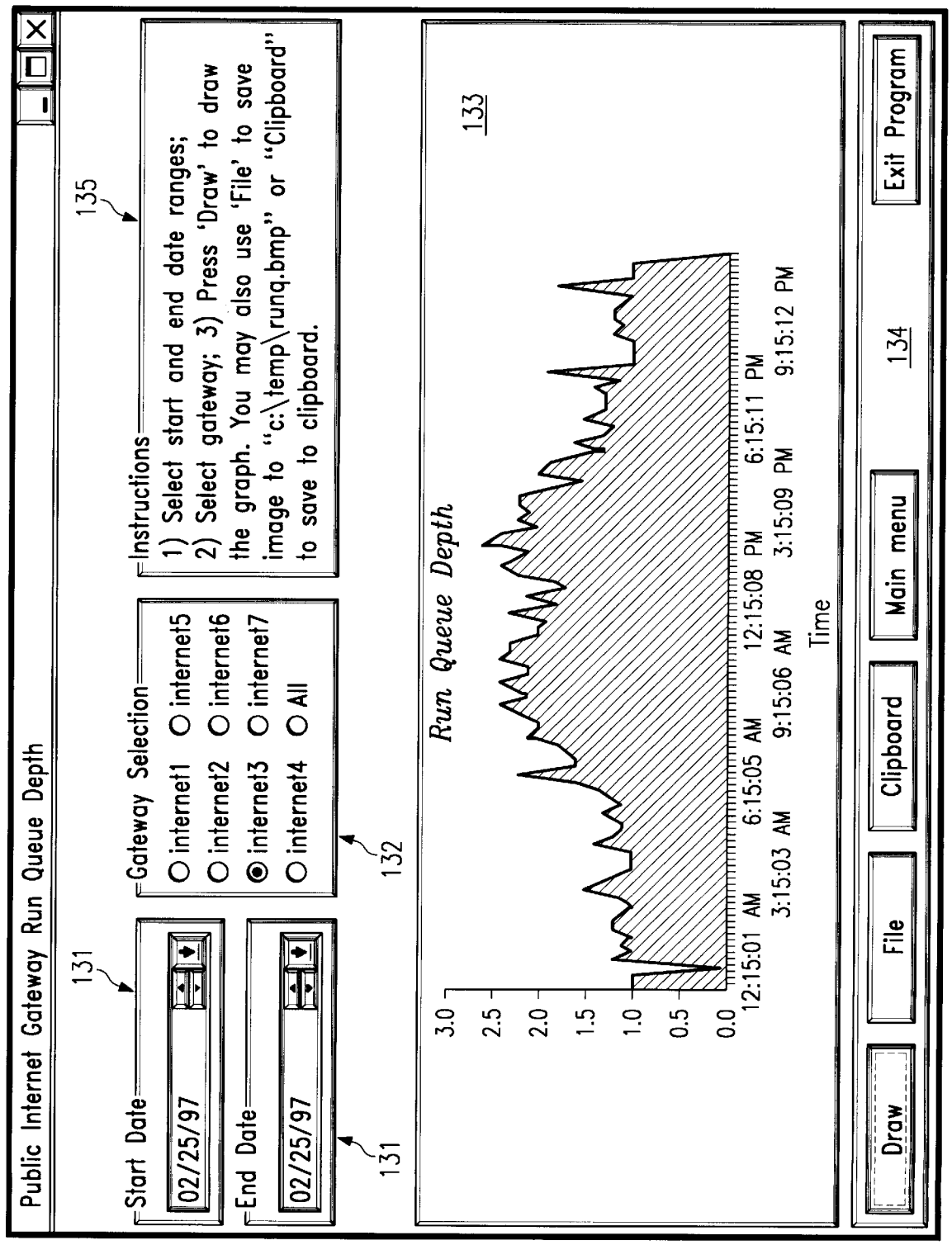

FIG. 4H is a diagram of one embodiment of a window, indicated generally at 130, for a run queue depth performance chart. As shown in FIG. 4H, window 130 includes a time period area 131 and a gateway selection area 132. Window 130 also includes a chart area 133, a plurality of buttons 134 and an instruction area 135. Chart area 134 displays to the user a graphical display of a performance chart of the run queue depth for the selected gateway during the designated time period. The run queue depth represents the number of requests pending in the run queue at any particular point in time. Thus, this performance chart shows the "depth" of users waiting on CPU resources and provides resource-related information about Internet gateways.

Although the present invention has been described in detail, it should be understood that various changes, substitutions, and alterations can be made hereto without departing from the spirit and scope of the invention as defined by the appended claims.

What is claimed is:

1. A system for Internet gateway performance charting, comprising:

an internal network having one or more servers interconnecting a plurality of computing devices;

an Internet gateway coupled to the internal network and to a public Internet, the Internet gateway providing connectivity between the plurality of computing devices of the internal network and the public Internet, and the Internet gateway executing an application that gathers statistics on the performance of the Internet gateway and prepares a statistics file storing statistics information;

a designated server of the internal network, the designated server operable to periodically receive and process the statistics file from the Internet gateway, the designated server operable to recover the statistics information from the statistics file, the designated server including a database, the designated server operable to populate the database with statistics data based upon the statistics information from the statistics file;

a computing device of the plurality of computing devices operable to execute an application that obtains statistics data from the database and displays selected performance charts based upon the statistics data such that a user of the computing device can view performance charts of the Internet gateway;

additional Internet gateways coupled to the internal network and to the public Internet, the additional Internet gateways providing connectivity between the plurality of computing devices of the internal network and the public Internet, and the additional Internet gateways each executing an application that gathers statistics on the performance of the Internet gateway and prepares a statistics file storing statistics information;

wherein the designated server is operable to periodically receive and process the statistics files from the additional Internet gateways, the designated server operable to recover the statistics information from the statistics files, the designated server operable to populate the database with statistics data based upon the statistics information from the statistics files; and wherein the application executed by the computing device further allows the user of the computing device to view performance charts of selected Internet gateways.

2. The system of claim 1, wherein the application executed by the computing device provides the user with a selection list of chart types.

3. The system of claim 2, wherein the chart types include user activity-related charts and resource usage-related charts.

4. The system of claim 1, wherein the Internet gateway periodically initiates a transfer of the statistics file to the designated server.

5. The system of claim 4, wherein the transfer is initiated automatically by the Internet gateway.

6. The system of claim 4, wherein the transfer is accomplished using a file transfer protocol (FTP) session.

7. The system of claim 1, wherein the designated server periodically initiates a transfer of the statistics file from the Internet gateway.

8. The system of claim 7, wherein the transfer is initiated automatically by the designated server.

9. The system of claim 7, wherein the transfer is accomplished using an FTP session.

10. A computing device for displaying Internet gateway performance charts to a user, comprising:

a memory storing a client application;

a network interface to an internal network; and a processor coupled to the memory, the processor executing the client application such that the computing device is operable:

to obtain statistics data from a database located on a designated server in the internal network, the statistics data related to performance of a plurality of Internet gateways servicing the internal network; and to display a selected performance chart based upon the statistics data such that a user of the computing device can view a performance chart for any combination of the plurality of Internet gateways.

11. The computing device of claim 10, wherein the computing device is further operable to provide the user with a selection list of chart types.

12. The computing device of claim 11, wherein the chart types include user activity-related charts and resource usage-related charts.

13. A method for Internet gateway performance charting, comprising:

automatically gathering statistics on the performance of a plurality of Internet gateways, each Internet gateway providing connectivity between an internal network and a public Internet;

preparing a file of statistics information associated with each Internet gateway;

storing the file of statistics information on each Internet gateway;

periodically transferring the file of statistics information from each Internet gateway to a designated server of the internal network;

populating a database on the designated server with statistics data based upon the statistics information from the file of statistics information; and displaying a selected performance chart based upon the statistics data such that a user can view a performance chart of any Internet gateway.

14. The method of claim 13, wherein displaying the selected performance chart is accomplished by a computing device of the internal network.

15. The method of claim 13, wherein the selected performance chart is one of a plurality of chart types provided in a selection list.

16. The method of claim 15, wherein the chart types include user activity-related charts and resource usage-related charts.

* * * * *